United States Patent [19]

Miller

[11] Patent Number: 5,622,740
[45] Date of Patent: Apr. 22, 1997

[54] METHOD FOR PREPARING EDIBLE CASINGS AND COMPOSITIONS THEREOF

[75] Inventor: Albert T. Miller, Bridgewater, N.J.

[73] Assignee: Devro Limited, Scotland, United Kingdom

[21] Appl. No.: 340,305

[22] Filed: Nov. 14, 1994

[51] Int. Cl.$^6$ .................................................. A22C 13/00
[52] U.S. Cl. .................. 426/138; 426/105; 426/129; 426/140; 426/278; 426/576; 426/656; 426/657
[58] Field of Search ..................................... 426/138, 105, 426/106, 129, 140, 576, 656, 657, 278

[56] References Cited

U.S. PATENT DOCUMENTS

| | | | |
|---|---|---|---|
| 3,346,402 | 10/1967 | Lieberman | 99/176 |
| 3,383,223 | 5/1968 | Rose | 99/176 |
| 3,917,862 | 11/1975 | Bridgeford | 426/274 |
| 3,943,262 | 3/1976 | Winkler et al. | 426/250 |
| 4,061,786 | 12/1977 | Winkler et al. | 426/138 |
| 4,378,017 | 3/1983 | Kosugi et al. | 424/35 |
| 4,585,655 | 4/1986 | Sherbänenko | 426/106 |

FOREIGN PATENT DOCUMENTS

| | | |
|---|---|---|
| 38628 | 10/1981 | European Pat. Off. |
| 2087185 | 12/1971 | France . |
| 4208435 | 10/1993 | Germany . |
| 233168 | 10/1944 | Switzerland . |
| 917965 | 2/1963 | United Kingdom . |
| 87/00429 | 1/1987 | WIPO . |

Primary Examiner—Esther Kepplinger
Assistant Examiner—Lien Tran
Attorney, Agent, or Firm—Eric P. Schellin

[57] ABSTRACT

A method and composition for producing an edible casing from an aqueous gelatin plasticizer composition which is given specific through-put parameters by means of a elongated rotating extruder which terminates in a die extruder for forming a film. The aqueous gelatin composition may also contain chitosan and/or hydroxypropylcellulose. Optionally, cross-linking agents, coloring agents, flavoring agents, preservatives and/or antioxidants may be included.

25 Claims, 2 Drawing Sheets

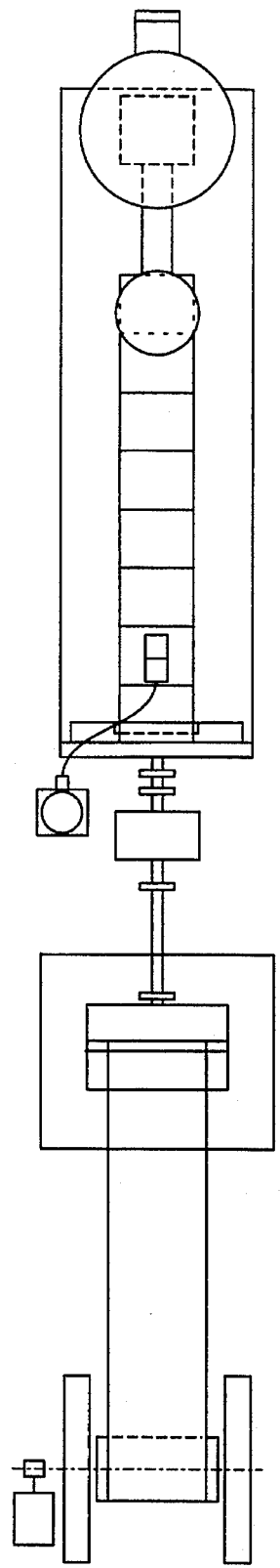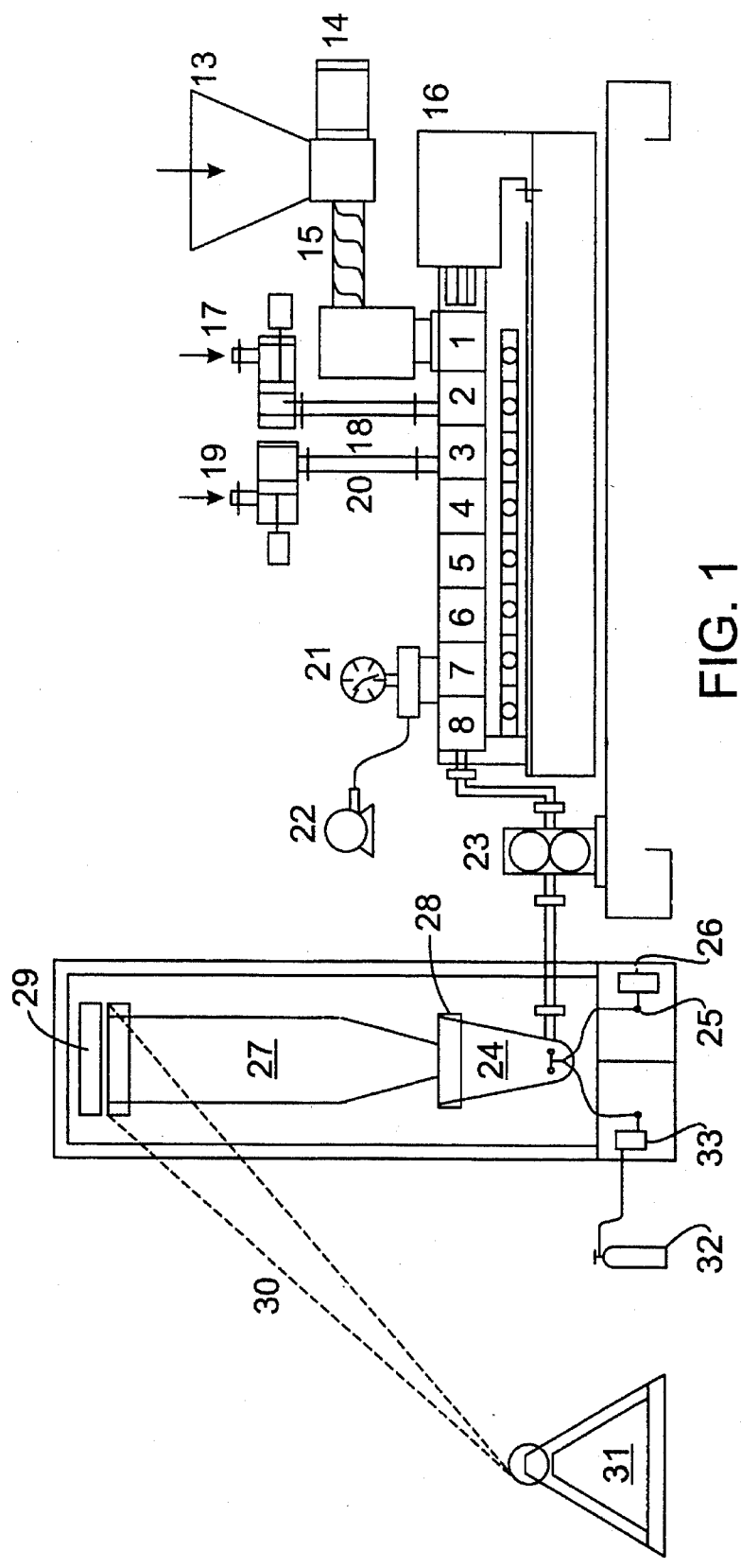

METHOD FOR PREPARING EDIBLE CASINGS AND COMPOSITIONS THEREOF

The present invention relates to an improved method for preparing edible casings and compositions thereof. More particularly, the invention is concerned with a composition for edible casings which incorporates therein a quantity of gelatin.

BACKGROUND OF THE INVENTION

The prior art is replete with the use of edible tubular casings for sausage meat wherein the casing is made of certain intestines of animals. Such casings are not completely satisfactory as they are relatively scarce. As they are retrieved during conventional animal butchering steps the casings are often inadvertently marred by knife nicking during the butchering process making such intestines useless as casing material. In addition the thickness of the wall and diameter of these casings will vary, causing difficulty during modern high speed stuffing.

As a result of the difficulties and increased expense associated with intestine derived casings, also know as natural casings, the industry has experimented and disclosed the use of both artificial edible casings and artificial non-edible casings. The latter, of course, have the decided disadvantage in that the artificial non-edible casings have to be removed from the meat product prior to use.

The artificial edible casings are conventionally fabricated from a composition incorporating large quantities of collagen. The latter is also available from by-products in butchering processes. Collagen, while very useful, is only available on a limited scale and is therefor relatively expensive.

As stated, traditionally, artificial, edible-type sausage casings have been prepared from animal derived collagen e.g. U.S. Pat. No. 3,123,653 Lieberman, E. R. and U.S. Pat. No. 3,525,628 Cohly, M. A. Specifically, edible casings have been prepared by processing animal hides in such a way as to disrupt the collagen structure into an extrudable mass which is reformed into a tubular membrane. The process is very complex and involves many time consuming steps to chemically and mechanically treat the collagen material. Because this natural protein is very heat sensitive, the process must be carried out under conditions of low temperature to avoid undesirable degradation. Thus, traditional "hot melt" extrusion techniques which are commonly used in producing conventional plastic packaging materials is not appropriate. Additionally, since collagen materials must be extruded at relatively low solids concentrations (3.5 to 8.0%), both chemical dewatering and forced air drying are used to obtain a suitable product for use in sausage products.

Gelatin has been considered for use in preparing edible packaging materials because it is more economical to obtain than is collagen and because it can be sourced as a dry powder which is easily handled and stored. Although gelatin has been successfully used at low concentration as an additive to improve or modify the properties of collagen casings, there has not been a successful method for producing a predominately gelatin casing.

Lieberman in U.S. Pat. No. 3,346,402 describes a method of extruding a homogeneous mixture of 80 to 95 parts of swollen tendon collagen and 5 to 20 parts of gelatin to form a continuous tube for use as a sausage casing. The extruded tube must be coagulated, tanned, plasticized, and dried to obtain a moisture content of 10–30%. If more than 20% gelatin is present, the extruded tubing lacks sufficient strength to function as a casing.

European Patent 0,038,628 to Kosugi, J. et al discloses a method for producing a modified composite structure by partially replacing collagen with gelatin. Levels of approximately 5% gelatin were used. The material was not suitable for extrusion into a tube, but rather was formed into a casing by using an electrodeposition process. This method does not lend itself to high speed production methods.

U.S. Pat. No. 3,943,262 to Winkler, B. et al utilizes small amounts of gelatin as the carrier and fixative for dyes that are added to edible collagen casings. U.S. Pat. No. 3,917,862 to Bridgeford, D. J. employs gelatin as an adhesive used for patching edible artificial sausage casings. Gelatin has also been used as a coating on the inside of non-edible fibrous casings to improve adhesion of the casing to the surface of dried sausage, e.g. German Offen. 2,100,210, O'Brien, M. N. et al and U.S. Pat. No. 3,383,223, Rose H. J.

Under normal conditions it is exceedingly difficult to produce tubular sausage casings from gelatin. Because of viscosity effects and difficulties in mixing uniform solutions, gelatin concentrations are normally used at relatively low concentrations typically 5 to 15% and rarely above 25%. Extrusion of this material is usually carried out under low pressure and the resulting film layer must be supported on a coating surface such as a release belt or casting drum. These films are too weak to be self supporting in either sheet or tubular form. Also, because of the moisture contents, the material must be passed through a drying chamber to increase the solid conentration.

A number of other edible compositions have been contemplated in the fabrication of edible tubular casings for meat, but have not met with success. Usually, such other products have been unduely expensive but more importantly have not provided the appropriately needed strength and physical properties necessary to sustain the encased meat product during its shelf life period in a refrigerated case in a store or home. More, importantly, the casing may not withstand the rigors accompanying the cooking process.

BRIEF SUMMARY OF THE INVENTION

The present invention, contemplates the avoidance of the prior art failures by incorporating gelatin as the foundation of a successful acceptable casing product. Gelatin is, of course, a naturally occurring proteinaceous product which is widely and readily available.

Further, it is an object of the present invention to remedy the deficiencies described above and to provide a new method for manufacturing edible sausage casings which is considerably less complicated than that of known and unsatisfactory methods and which will allow for use of lower cost ingredients.

According to the present invention, powdered gelatin is fed into a twin screw compounding device and less than 60% water and plasticizer is added at elevated temperature and pressure to form a melt which is deaerated, forced through a die, withdrawn under tension, expanded with air and allowed to cool. The stretch in the machine and transverse direction is precisely controlled to achieve the desired balance in the orientation of the casing structure.

Optionally, 5 to 15% hydroxypropylcellulose sold under the registered trademark KUCEL may be added to improve extrudability and increase thermal stability of the extruded casing. In addition, a 2 to 5% solution of acidified de-N-acetylated chitin (chitosan) may be added to form a gelatin/ chitosan composite tube which has improved wet strength. Further, wet strength improvements have been demonstrated through the introduction of cross-linking agents into the melt stream prior to de-aeration and tube formation at the die. The preferred cross-linkers are glutaraldehyde and dextrose. Additional improvements in film characteristics can be accomplished by treatment of the hardened casing with gaseous ammonia.

In many aspects the success of the tubular casing containing gelatin is due to the important fact that the gelatin containing composition goes through procedural steps as further outlined hereinafter.

BRIEF DESCRIPTION OF THE DRAWINGS

FIG. 1 depicts a flow diagram illustrating the sequences of steps in the continuous manufacture of an edible casing in accordance with the present invention.

FIG. 2 is a top plan view illustrating the arrangement of the equipment employed in accordance with the present invention.

DETAILED DESCRIPTION OF THE INVENTION AND DRAWINGS

Figure 3:
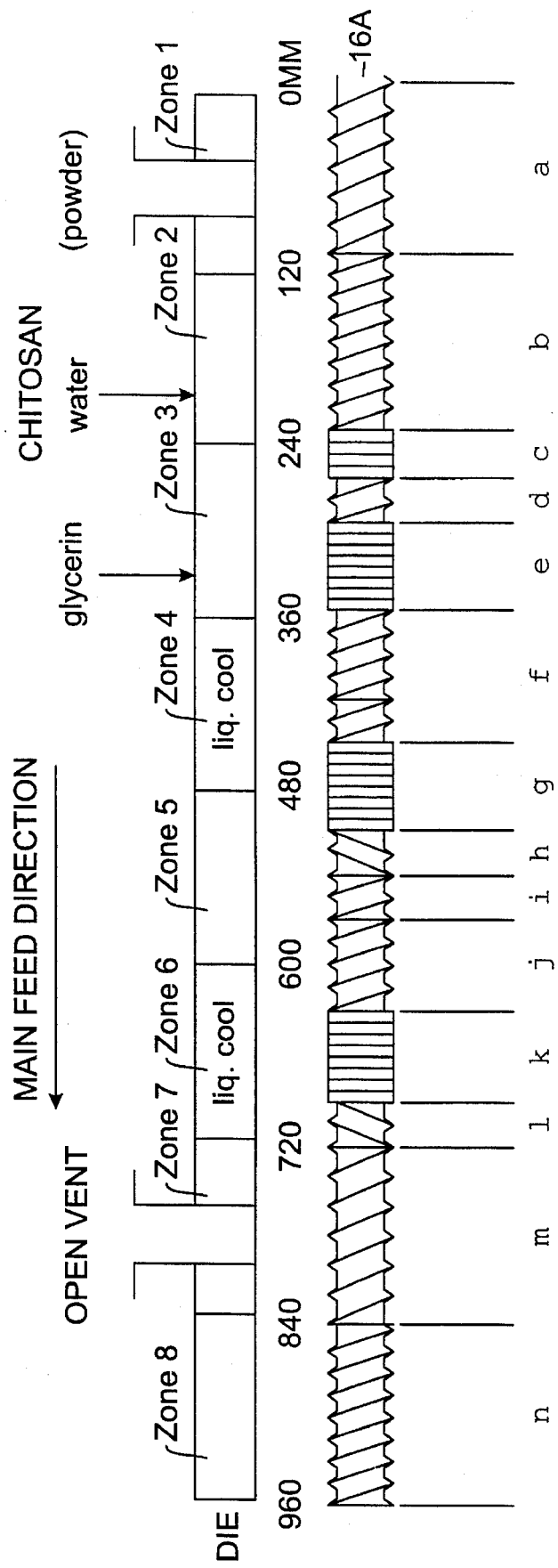
FIG. 3 is a diagrammatic view illustrating a screw profile employed a co-rotating twin-screw extruder.

As stated in the foregoing the principal components of the edible casing of the present invention is gelatin. Common sources of gelatin contemplated by this invention include skins, bones, hides and white connective tissues of the animal body. Grades of gelatin that are appropriate for this invention include pharmaceutical grade, food grade, Type A and Type B. Gelatins with bloom values of 150 to 250 are preferred but gelatins with bloom values as high as 300 and as low as 100 can be utilized. Gelatin levels useful in this invention are in the range of 40 to 65% by weight. While the preferred plasticizer used in this invention is glycerin, other food grade polyhydric alcohols such as sorbitol, mannitol and propylene glycol are suitable alternatives. Plasticizer levels useful in this invention are in the range of from 5 to 30% by weight.

The addition of chitosan (de-N-acetylated chitin) to the gelatin composition is effective in producing a stiffer extrusion melt which exhibits reduced stretch characteristics. The edible casings produced from the gelatin/chitosan composite are less tacky at extrusion and are easier to cool and set in the blown-film tower than when using gelatin compositions without chitosan. Tensile strength of edible casing films produced from the gelatin/chitosan composite are significantly stronger than are comparable edible casing films produced without the addition of chitosan. Useful levels of chitosan are in the range of 1 to 20% by weight. The chitosan useful in this invention is a commercial deacetylated chitin extracted from crab and shrimp shells which have a deacetylation of between 75 and 95%.

To use chitosan in this invention it has been found most convenient to prepare solutions by slurrying chitosan in water containing dilute organic acids such as acetic, formic, lactic, adipic, malic, etc. Heating the solution to 80° C. can be instituted to accelerate dissolution. The pH of the solution is 6.0 or less.

The addition of hydroxypropylcellulose to the gelatin composition is effective in increasing the moisture resistance of the edible casings produced in this invention. The non-ionic cellulose ether is produced by Aqualon, Wilmington, Del. under the tradename KLUCEL. Useful levels of hydroxypropylcellulose are in the range of from 1 to 20% by weight.

It has been found useful to include a preservative and/or antioxidant in the composition to maintain the quality of the edible casing and/or contents contained in the casing. Food grade preservatives useful in this invention include potassium sorbate, sodium ascorbate, methyl and propyl paraben, butylated hydroxyanisole and butylated hydroxytoluene.

Wet strength improvements have been demonstrated through the introduction of cross-linking agents into the melt stream prior to de-aeration and tube formation at the die. The preferred cross-linking agents are glutaraldehyde and dextrose. Glutaraldehyde can be used in the range of from 10 to 200 ppm by weight. Dextrose can be used in the range of from 0.25 to 20%. When dextrose is used its optimal benefit is achieved when the edible casing film is aged in an oven at 85° C. for 18 hours.

Attention is now directed to FIGS. 1 and 2. Gelatin powder is delivered to a hopper 13 which feeds the gelatin powder to a conventional loss-in-weight dry powder feeder 14. The loss-in-weight feeder 14 is equipped with an auger 15 which continuously delivers powdered gelatin at a controlled rate to the entrance Zone 1 of a conventional co-rotating twin-screw extruder 16. The extruder screws are detailed parallel and intermesh to move the gelatin powder to Zone 2 where it is compounded with the aqueous phase delivered via piston pump 17 to an injection conduit 18. The extruder screws mix, compound and convey the gelatin powder and aqueous phase materials and moves the thereby produced admixture to Zone 3 where glycerin is received into the mixture via injection conduit 20 as supplied by piston pump 19. The resultant material is further mixed, compounded and is temperature controlled to produce a melt as the material passes through Zone 4, 5 and 6. At Zone 7 the polymer melt resultant is deaerated via vacuum port 21 which is suitably connected to a vacuum pump 22. Thereafter, the deaerated extrusion melt resultant is extruded through Zone 8, towards and into conventional Zeneth melt pump 23 which provides constant pressure to an annular film extrusion die 24.

It is noted that the temperatures of the individual stated zones of the extruder were operated as follows:

Zone 1, at 50° C.
Zone 2, at 55° C.
Zone 3, at 55° C.
Zone 4, at 55° C.
Zone 5, at 80° C.
Zone 6, at 80° C.
Zone 7, at 75° C.
Zone 8, at 77° C.

The melt temperature, somewhat due to pressurization, at the extrusion die 24 was 80° C. The edible polymeric material exiting therefrom was at a pressure of 125 psi.

As the molten polymer film emerges from the die in the form of a tube 27 it is immediately inflated by air pressure within the tube 27. The air flow is controlled by a flow pressure gauge 26 in the compressed air line feeding the extruder.

Downstream a wide nip roll 29 pinches off and collapses the inflated polymer tube 27 and maintains a desired diameter via a trapped air bubble.

Intermediate to the extrusion die 24 and the nip roll 29 is a circumferential circular air vent 28 detailed to blow cooling air against the outside of the moving polymer tube to control the rate of expansion by rapidly cooling the film. Since the bubble grows during inflation in both directions (TD and MD), the film speed at the downstream nip rolls 29 must be faster than the tube speed as it emerges from the die. A typical MD stretch (ratio of initial to final film speed) and TD blow-up ratios (ratio of final to initial tube diameter) are in the 2:1 to 5:1 range, but may be as high as 10:1. The collapse of the tube at the nip 29 is controlled to avoid bunching in the nip and avoid discontinuity in the pulling force being translated back to the drawing melt. The flattened tube 30 is then conveyed to a wind-up station.

As the co-rotating twin-screw extruder plays an important role in admixing and compounding of the polymeric aqueous materials attention is now directed to FIG. 3 which shows a side schematic view of the one screw, realizing, of course, that its mate (not shown) is identical and rotates in the same direction. At the beginning and at the end the segments (a) and (m) consist of forwarding paddles with a 30 mm pitch. Then segments (b), (d), (i), (j) and (n) are forwarding paddles with a 20 mm pitch. On the other hand (c), (e), (g), and (k) are kneading disks where compounding takes place while (h) and (l) segments are reversing elements.

The various zones are shown to have equi-distant dimensions of 120 mm, wherefore the graduations in FIG. 3 are to linear metric dimensions. Such dimensions are illustrative of an applicable co-rotating twin screw extruder. It should be appreciated that the dimensions may vary depending upon the diameter of the extruder screws, or the pitch of the screws and the rotational speed imparted to the screws.

It is also contemplated that the co-rotating twin screws be made up of different segments which are easily and conventionally secured to produce the desired configuration. In regard thereto some of the segments are designed to be in a conveying mode while others are designed for a compounding mode. Generally, as stated, segments (c), (e), (g) and (k) are compounding segments, while, generally, the other segments are designed to convey, i.e. advance the materials linearly.

The co-rotating twin screws are conventionally jacketed with appropriate cooling or heating means. It will be appreciated that the mixing compounding and conveying of the materials will affect the temperature of the materials being worked on so the materials will be either cooled or heated as appropriate and necessary to achieve the temperature gradients contemplated with regard to the zones aforementioned.

While, in the present invention it is contemplated that the extruder of preferred choice is a co-rotatable twin screw, it may be appropriate to employ a counter rotating twin screw extruder if the same or similar treatment can be accomplished with the material. Usually, counter rotating screws will provide undersirable undue vigorous compounding. Change to the various through put parameters, e.g. speed of rotation and/or amount of water to solids ratio may make it possible to use a counter rotating twin screw or even an entirely different, introducing conveying, mixing, compounding and extruding system may be achievable.

In the foregoing the apparatus of the present invention has been discussed. In the following, examples of casing production is set forth

EXAMPLE I

An edible tubular casing was prepared from gelatin, glycerin, and water using a twin-screw extruder fitted with an annular die all as detailed in the foregoing. A commercial Type B gelatin powder (Atlantic Gelatin) was used which had a Bloom Strength of 250, a pH of 5.0 and a solids content of 91.6%. The gelatin powder was continuously fed to the entrance zone of a ZSE—27 mm co-rotating twin-screw extruder at a rate of 3.3 pounds per hour. In Zone 2 of the extruder water was continously injected into a port at a rate of 2.2 pounds per hour. The water was fed from a Milroyal model D41 piston pump 17 with a 12% stroke. In a subsequent Zone 3 glycerin was continuously injected at a rate of 1.54 pounds per hour. The glycerin was fed from a Milroyal Model DB2 piston pump 19 with a 26% stroke. At Zone No. 7 a vacuum pump was installed and a vacuum was continously drawn to approximately 400 millibar. The screw speed of the co-rotating twin screws extruder was operated at 300 rpm. The temperatures of the individual zones were set at: Zone 1—50° C., Zone 2—55° C., Zone 3—55° C., Zone 4—55° C., Zone 5—80° C., Zone 6—80° C., Zone 7—75° C., and Zone 8—77° C. The gelatin solution was fed to a Zeneth melt pump 23 to maintain constant pressure to the die 24. The temperature at the die was 80° C. The material exited the annular nozzle/die at a pressure of 125 psi. Air was injected into the tube as it exited the extruder to effect a blow film process. The diameter of the casing was increased from 25.4 mm to 203 mm, thereby effectively introducing a tranverse directional orientation.

As the extruded tube move up the blown film tower, it passes through an air cooling ring 28 to reduce the temperature of the film and enable it to congeal and set. This hardened tube passes between guide rolls to a pinch roll 29 which flattens the tube and moves the flattened tube to a wind-up station 31.

The film produced in this example had a tensile strength of 552 psi, an elongation value of 195% and a thickness of 3.2 mils.

EXAMPLE II

The process in Example I was followed except anhydrous ammonia gas was also injected into the tube as it exited the extruder. The ammonia was fed from a 15-pound compressed gas cylinder 32 through pressure control regulators and a Matheson Model 7641 flow meter 33 at a rate of 20 cc/min.

The ammonia gas effectively increased the pH of the blown film and reduced the tackiness on the internal surface of the tube.

EXAMPLE III

The process of Example II was followed except that the solvent injected into the extruder in Zone 2 was a mixture of water, chitosan, and lactic acid in a ratio of 26:1:0.54. The chitosan (Pronova Secure 240) has a deacetylation value of 80.7% and an ash content of 0.58%. The chitosan/protein complex resulted in a stiffer extrusion melt which exhibited reduced stretch characteristics, but produced more stable films which were less tacky at extrusion and easier to cool and set in the blown-film tower. The chitosan solution was prepared by adding 187 pounds of water to a stainless steel vessel equipped with Barrington and Lightening mixers. The 7.2 pounds of chitosan was slowly added to the vortex under agitation until completely wetted, followed by the addition of USP lactic acid (88%) until the pH stabilizes at 4.5 the (the solution becomes clear). This solution was then filtered through a No. 120 mesh stainless steel screen.

The film produced in this example had a machine-directional (MD) tensile strength of 2190 psi, a transverse-directional (TD) tensile strength of 1700 psi and an MD:TD ratio of 1.29. The MD elongation was 120% while the TD elongation was 210%. The film thickness was 2.2 mils and the pH was 6.6.

EXAMPLE IV

The process of Example III was followed except the glycerin injected into Zone 3 contain 140 ppm of FD&C red #3 certified food dye. The dye was uniformly dispersed in the extruder and produced an edible tubular film with a transparent red color. Other applicable dyes for edible food casings can be found in U.S. Pat. No. 3,943,262 which is incorporated herein in its entirety by reference.

EXAMPLE V

An edible film was prepared from gelatin, chitosan, glycerin and water using a twin-screw extruder fitted with a conventional coat-hanger style slit die having a gap of 127 mm in length and 0.75 mm in width. The gelatin powder was fed to the entrance zone 1 of the extruder at a rate of 11.75 pounds per hour using a loss in weight dry-powder feeder (Control and Metering Ltd.). The aqueous chitosan solution was injected into Zone 2 at a rate of 8 pounds per hour. In this example, the glycerin as plasticizer was injected into Zone 6 at a rate of 5.25 pounds per hour. The screw speed of the ZE 40 mm co-rotating twin-screw extruder was operated at 200 rpm. The temperatures of the individual zones were set at: Zone 1—50° C., Zone 2—69° C., Zone 3—71° C., Zone 4—72° C., Zone 5—70° C., and Zone 8—43° C. The pressure at the extruder die was 50 psi. The film exited the die directly onto a continuously revolving chrome-plated roll which was internally cooled with water. The speed of the quench roll was operated at a rate which was 40% faster than the rate at which the polymer melt exited the die, thus effectively stretching the material to achieve a thin, transparent film. Once the polymer melt was completely congealed it was removed from the quench roll and wound onto a take-up spool.

The film prepared in this example had a pH of 5.1, a thickness of 1.7 mils, a tensile strength of 1160 psi, and an elongation value of 140%.

This film material was used in preparing casings by forming a cylindrical tube which was overlapped and heat sealed along a bead on the lateral surface using a 380 W impulse sealer (American International Electric).

EXAMPLE VI

The method of Example V was followed except that the glycerin contained 40 ppm of liquid-smoke flavoring (Charsol C-10). Another example of an applicable aqueous liquid smoke composition can be found in U.S. Pat. No. 4,104,408 which is incorporated herein in its entirety by reference. The flavoring is dispersed uniformly throughout the extrusion melt, and resulted in an edible film having a mild smoke-like odor.

EXAMPLE VII

The method of Example I was followed except that dextrose was pre-blended with a gelatin powder at a level of 2%. The powdered pre-mix was continously fed to the entrance zone 1 of the extruder at a rate of 3.3 pounds per hour. The water was continually injected into Zone 2 at a rate of 2.2 pounds per hour and the glycerin was continuously injected into Zone 3 at a rate of 1.23 pounds per hour.

EXAMPLE VIII

The method of Example III was followed except that the collapsed tubing was aged or annealed in an oven at 85° C. for 18 hours and subsequently humidified at 70% relative humidity for one hour.

The film produced in this example had a machine-directional (MD) tensile strength of 2030 psi a transverse directional (TD) tensile strength of 2000 psi and an MD:TD ratio of 1.02. The MD elongation was 120% and the TD elongation was 170%. The film thickness was 2.3 mils.

EXAMPLE IX

The casing of Example V was stuffed with fresh Italian sausage batter and linked on a model 8-head Z-linker to form individual sausage links. The encased sausage was grilled in a pan at 325° F. for 18 minutes. The cooked sausage had excellent eating quality, tender bite, and was free of the typical casing shrinkage characteristics associated with prior art casings, especially collagen casings.

EXAMPLE X

The gelatin-chitosan casing of Example III was filled with boned brine-cured pork shoulders and then encased in a stockinette. U.S. Pat. No. 5,147,671 shows a conventional collagen coated meat product being encased in a stockinette. After smoking and cooking to an internal temperature of 155° F., the ham was chilled and weighed. There was a significant reduction in weight loss in this ham in comparison to a similar product prepared without the film of the present invention. In addition, the presence of the film facilitated easy removal of the stockinette without damage to the meat surface.

EXAMPLE XI

The tubular film prepared in Example III was slit open to form a sheet which was then cut in to 9-inch circular sections. This edible film material was applied to the surface of a conventionally prebaked pizza crust prior to addition of a conventional topping including tomato sauce, grated cheese and sliced Italian sausage and the usual condiments. The complete pizza pie was then covered with aluminum foil, frozen at 4° C. and stored at 4° C. for 10 days. The frozen pizza was removed from the freezer, unwrapped and heated in a microwave over for five minutes. The edible film of this invention effectively retarded moisture from migrating out of the moist topping and into the pizza crust, thus maintaining the crispness of the crust. Additionally, the edible film melted during cooking thereby minimizing its presence during consumption.

What is claimed is:

1. The method For making an edible film useful for a casing for a food product, comprising:

adding a quantity of powdered gelatin into a first zone of a cylindrical extruder containing a rotatable screw defining a spiral pathway, rotating said screw whereby to linearly move said quantity of said powdered gelatin along said spiral pathway, adding a quantity of an aqueous medium into a second zone of said extruder, continuing to rotate said screw whereby to linearly move and compound said quantity of said aqueous medium and said powdered gelatin along said spiral pathway, adding a quantity of a plasticizer selected from the group consisting of glycerin, sorbitol, mannitol and propylene glycol into a third zone said extruder, continuing to rotate said screw whereby to linearly move and compound together said quantity of said plasticizer, said aqueous medium and said powdered gelatin along said spiral pathway to form a mixture, heating said mixture to a temperature whereby said gelatin is melted while continuing to rotate said screw, said respective quantities of gelatin, said plasticizer, and said aqueous medium being between 40 to 65% gelatin, between 5 to 30% by weight plasticizer and the balance being the aqueous medium, deaerating said mixture, thereafter extruding said mixture to form a film.

2. The method of claim 1 wherein the extrusion step includes extruding said mixture to form a tube, pressurizing said tube with air to thereby inflate it and thereafter collapsing said tube.

3. The method of claim 2 wherein the air includes ammonia which treats and permeates said tube.

4. The method of claims 1 or 2 or 3 wherein said aqueous medium includes a quantity of chitosan and is acidified with an organic acid.

5. The method of claim 4 wherein the organic acid is lactic acid and the ratio of aqueous medium is about 26, the chitosan is about 1 and the ratio of lactic acid is about 0.54.

6. The product produced by the method of claim 4.

7. The method of claims 1 or 2 or 3 wherein the quantity of powdered gelatin includes a quantity of dextrose.

8. The product produced by the method of claim 7.

9. The method of claims 1 or 2 or 3 wherein said plasticizer contains a material selected from the group consisting of flavoring agents, food dyes and mixtures thereof.

10. The product produced by the method of claim 9.

11. The method of claim 1 including the further step of forming the film into a tubular food casing.

12. The method of claim 11 wherein the formed tubular food casing is stuffed with a meat product, the stuffed food casing is then introduced into a tubular stockinette, the stockinette containing the stuffed food casing is cooked and is followed by the removal of the stockinette.

13. The product produced by the method of claim 1.

14. The product produced by the method of claim 2.

15. The product produced by the method of claim 3.

16. The method of claim 1 wherein the film produced thereby is positioned between an edible baked crust substrate and an aqueous edible food topping to produce a food product.

17. The method of claim 16 wherein the food product is frozen.

18. The method of claim 17 wherein the frozen food product is thawed and heated.

19. The method of claims 2 or 3 wherein the collapsed tube is aged for about 18 hours at about 85° C.

20. The method of claims 1, 2 or 3 wherein said aqueous medium includes a quantity of hydroxypropylcellulose.

21. The method according to claim 1 wherein the aqueous medium also includes a cross-linking agent, a colorant, a flavorant, and a preservative.

22. The method according to claim 1 wherein said mixture of said aqueous medium, said gelatin and said plasticizer includes acidified chitosan in the range of 1 to 20% by weight and a crosslinking agent.

23. The method according to claim 1 wherein said mixture of said aqueous medium, said gelatin and said plasticizer includes hydroxypropylcellulose in the range of 1 to 20% by weight and a crosslinking agent.

24. The method according to claim 22 wherein said mixture includes a colorant, a flavorant and a preservative.

25. The method according to claim 23 wherein said mixture includes a colorant, a flavorant and preservative.

* * * * *